United States Patent
Chennuri

(10) Patent No.: US 11,310,216 B2
(45) Date of Patent: Apr. 19, 2022

(54) APPARATUS AND METHOD FOR PREDICTIVE TOKEN VALIDATION

(71) Applicant: Futurewei Technologies, Inc., Plano, TX (US)

(72) Inventor: Karun Kumar Chennuri, Bellevue, WA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 15/929,965

(22) Filed: May 31, 2020

(65) Prior Publication Data

US 2020/0296083 A1 Sep. 17, 2020

Related U.S. Application Data

(62) Division of application No. 15/446,943, filed on Mar. 1, 2017, now Pat. No. 10,693,867.

(51) Int. Cl.
*H04W 12/06* (2021.01)
*H04L 29/06* (2006.01)
*H04W 12/08* (2021.01)

(52) U.S. Cl.
CPC .......... *H04L 63/083* (2013.01); *H04L 63/102* (2013.01); *H04W 12/06* (2013.01); *H04W 12/08* (2013.01)

(58) Field of Classification Search
USPC ............ 726/9, 2, 21, 36; 713/150, 163, 181; 380/255, 264, 276
See application file for complete search history.

(56) References Cited

U.S. PATENT DOCUMENTS

| 9,038,134 | B1 | 5/2015 | Ackerman et al. |
| 9,461,980 | B1 | 10/2016 | Agrawal et al. |
| 2013/0185253 | A1* | 7/2013 | Mohammed ........... G06Q 10/10 707/609 |

(Continued)

FOREIGN PATENT DOCUMENTS

| CN | 103595809 A | 2/2014 |
| CN | 105229633 | 1/2016 |
| CN | 105871854 | 8/2016 |

OTHER PUBLICATIONS

"U.S. Appl. No. 15/446,943, Final Office Action dated Aug. 19, 2019", 11 pgs.

(Continued)

*Primary Examiner* — Sharif E Ullah
(74) *Attorney, Agent, or Firm* — Schwegman Lundberg & Woessner, P.A.

(57) ABSTRACT

An apparatus and method are provided for predictive token validation. In use, a database stores service usage information relating to usage of at least one service hosted by at least one server. Before at least one request for service is received from a user at the at least one server, the service usage information in the database is accessed. Further, based on the service usage information, a token associated with the user is sent to the at least one server for being validated by the at least one server, such that the at least one server allows access to the at least one service by the user, in response to the at least one request for service being received from the user with an identifier that is different from the token.

20 Claims, 10 Drawing Sheets

(56) References Cited

U.S. PATENT DOCUMENTS

| | | | | |
|---|---|---|---|---|
| 2014/0282993 | A1* | 9/2014 | Van Till | G07C 9/27 |
| | | | | 726/9 |
| 2015/0074407 | A1* | 3/2015 | Palmeri | H04L 63/0823 |
| | | | | 713/171 |
| 2015/0089623 | A1* | 3/2015 | Sondhi | H04L 63/0815 |
| | | | | 726/9 |
| 2016/0125011 | A1 | 5/2016 | Petschulat et al. | |
| 2016/0191512 | A1* | 6/2016 | Tatourian | H04L 63/0861 |
| | | | | 726/7 |
| 2016/0262021 | A1* | 9/2016 | Lee | H04L 63/0807 |
| 2016/0294806 | A1 | 10/2016 | Du et al. | |
| 2017/0111345 | A1* | 4/2017 | Heiman | H04L 63/083 |
| 2018/0255040 | A1 | 9/2018 | Chennuri | |

OTHER PUBLICATIONS

"U.S. Appl. No. 15/446,943, Non Final Office Action dated Feb. 15, 2019", 10 pgs.

"U.S. Appl. No. 15/446,943, Notice of Allowance dated Feb. 26, 2020", 12 pgs.

"U.S. Appl. No. 15/446,943, Response filed Nov. 14, 2018 to Restriction Requirement dated Oct. 9, 2018", 6 pgs.

"U.S. Appl. No. 15/446,943, Response Filed Nov. 14, 2019 to Final Office Action dated Aug. 19, 2019", 9 pgs.

"U.S. Appl. No. 15/446,943, Response Filed May 15, 2019 to Non Final Office Action dated Feb. 15, 2019", 9 pgs.

"U.S. Appl. No. 15/446,943, Restriction Requirement dated Oct. 9, 2018", 5 pgs.

"Chinese Application No. 201880012496.0, First Office Action dated Mar. 17, 2020", (dated Mar. 17, 2020), 17 pgs.

"Chinese Application No. 201880012496.0, Search Report for First Office Action", (dated Mar. 11, 2020), 3 pgs.

"European Application No. 18761766.7, Extended European Search Report dated Jan. 3, 2020", (dated Jan. 3, 2020), 8 pgs.

"International Application No. PCT/CN2018/077371, International Search Report and Written Opinion dated May 22, 2018", (dated May 22, 2018), 10 pgs.

Ahmed, Khandakar, et al., "Identity and Access Management in Cloud Computing", Cloud Computing for Enterprise Architectures, Jan. 1, 2011, XP055652115, (Jan. 1, 2011), 115-133.

Bedi, Punam, et al., "Predicting Attribute based User Trustworthiness for Access Control of Resources", Hybrid Intelligent Systems (HIS), 2012 12th InternationalConference on, IEEE, Dec. 4, 2012, XP032315806, (Dec. 4, 2012), 294-299.

Fischer, Matt, "Keystone Token Performance: Liberty vs. Mitaka", Matt Fischer's Blog, retrieved Nov. 29, 2018 [https://www.mattfischer.com/blog/?p=703], (May 2, 2016), 3 pgs.

Mathews, D., "Benchmarking OpenStack Keystone token formats", OpenStack, retrieved on Nov. 29, 2018 [http://dolphm.com/benchmarking-openstack-keystone-token-formats/], (Feb. 4, 2015), 8 pgs.

* cited by examiner

APPARATUS AND METHOD FOR PREDICTIVE TOKEN VALIDATION

CLAIM OF PRIORITY

This application is a divisional of and claims the benefit of priority to U.S. application Ser. No. 15/446,943, filed 1 Mar. 2017, which application is incorporated by reference as if reproduced herein and made a part hereof in its entirety, and the benefit of priority of which is claimed herein.

FIELD OF THE INVENTION

The present disclosure relates to user authentication systems, and more particularly to token validation techniques.

BACKGROUND

In a cloud environment, a validation of a user's secret token is a first step for successful invocation of a cloud service. During use of such a cloud service, there may be countless requests in a given time from multiple users. In each request, the user passes a token for being validated at the cloud service. Depending on a type of token that is used and a type of token validation check done at the cloud service, there may be a considerable performance impact on the cloud service. This may, in turn, result in network and processor overhead for servicing such repeated tasks. Further, there may be a delayed response for each client request due to the corresponding token validation check at the cloud service.

SUMMARY

An apparatus is provided for predictive token validation. Included are a non-transitory memory comprising instructions and one or more processors in communication with the memory. The one or more processors execute the instructions to store, in a database, service usage information relating to usage of at least one service hosted by at least one server. Before at least one request for service is received from a user at the at least one server, the service usage information in the database is accessed. Based on such service usage information, a token associated with the user is sent to the at least one server for being validated by the at least one server, such that the at least one server allows access to the at least one service by the user, in response to the at least one request for service being received from the user with an identifier that is different from the token.

Also provided is a computer-implemented method for predictive token validation. In use, a database stores service usage information relating to usage of at least one service hosted by at least one server. Before at least one request for service is received from a user at the at least one server, the service usage information in the database is accessed. Further, based on the service usage information, a token associated with the user is sent to the at least one server for being validated by the at least one server, such that the at least one server allows access to the at least one service by the user, in response to the at least one request for service being received from the user with an identifier that is different from the token.

Optionally, in any of the preceding embodiments, the identifier may include a universally unique identifier (UUID).

Optionally, in any of the preceding embodiments, the service usage information may identify the user and the at least one service.

Optionally, in any of the preceding embodiments, the service usage information may identify a time and/or a location associated with the user.

Optionally, in any of the preceding embodiments, the token may be sent based on the service usage information, by: determining whether the user has previously used the at least one service; and sending the token, if it is determined that the user has previously used the at least one service.

Optionally, in any of the preceding embodiments, the token may be sent based on the service usage information, by: abstaining from sending the token, if it is determined that the user has not previously used the at least one service.

Optionally, in any of the preceding embodiments, the token may be sent based on the service usage information, by: altering a content of the token, based on the service usage information.

Optionally, in any of the preceding embodiments, the identifier may be received in connection with at least one failed request for service that failed due to a lack of token validation. As an option, in response to the receipt of the identifier, the at least one failed request for service may be logged as service usage information in the database. As a further option, in response to the receipt of the identifier, the token associated with the user may be sent to the at least one server for being validated by the at least one server.

Optionally, in any of the preceding embodiments, the database may be populated with the service usage information by automatically collecting data on the usage of the at least one service hosted by the at least one server.

Optionally, in any of the preceding embodiments, the database may be populated with the service usage information by receiving manually created data on the usage of the at least one service hosted by the at least one server in connection with one or more user roles.

Optionally, in any of the preceding embodiments, access may be allowed to the at least one service, in response to the at least one request for service being received from the user, without waiting for the token to be validated.

Another apparatus is provided for predictive token validation. Included are a non-transitory memory comprising instructions and one or more processors in communication with the memory. The one or more processors execute the instructions to, before receiving at least one request for service from a user with an identifier, receive a token that is different from the identifier, based on service usage information relating to usage by the user of at least one service hosted by at least one server. Further, the token is validated. Still yet, after validating the token, the at least one request for service is received from the user. Access to the at least one service by the user is then permitted, in response to the at least one request for service from the user.

Also provided is another computer-implemented method for predictive token validation. Before receiving at least one request for service from a user with an identifier, a token is received that is different from the identifier, based on service usage information relating to usage by the user of at least one service hosted by at least one server. Further, the token is validated. Still yet, after validating the token, the at least one request for service is received from the user. Access to the at least one service by the user is then permitted, in response to the at least one request for service from the user.

Optionally, in any of the preceding embodiments, the access may be permitted without receiving the token from the user.

Optionally, in any of the preceding embodiments, another request for service may be received from the user in connection with another service hosted by the at least one server. In response to the another request for service from the user, it may be determined whether the token is validated in connection with the another service. If it is determined that the token is not validated in connection with the another service, the identifier may be sent for requesting the token so that the token can be validated.

One or more of the foregoing features of the aforementioned apparatus and/or method may afford a mechanism for performing token validation before users request access to services of a services platform, based on a prediction of such access. This may, in turn, result in accelerated access to the services of the services platform that would otherwise be foregone in systems that lack such capability. It should be noted that the aforementioned potential advantages are set forth for illustrative purposes only and should not be construed as limiting in any manner.

DETAILED DESCRIPTION

Figure 1:
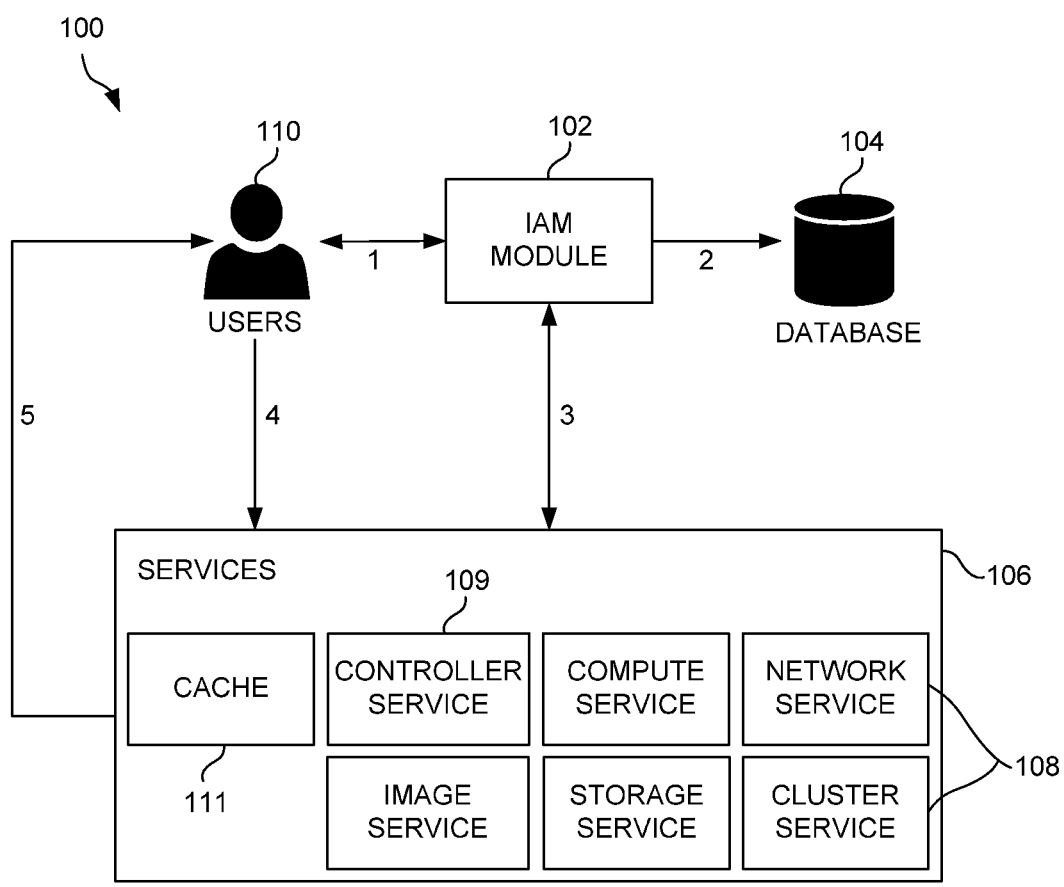
FIG. 1 illustrates a system for predictive security token validation, in accordance with an embodiment.

FIG. 1 illustrates a system 100 for predictive security token validation, in accordance with an embodiment. As shown, the system 100 includes an identity and access management (IAM) module 102 in communication with a database 104 and a services platform 106. It should be noted that the communication between the foregoing components of the system 100 may be afforded by way of any type of networking (e.g. bus networks, local networks, remote networks, etc.).

Further, while the various components are shown to be separate and discrete in one possible embodiment, other optional embodiments are contemplated where one or more (or even all) are integrated. To this end, each of the illustrated components of the system 100 may include any combination of software and/or hardware capable of performing their intended tasks that will be elaborated upon below, and may or may not share underlying hardware with one or more of the other components of the system 100. The illustrated components can communicate with each other using one or more data communication networks such as, for example, the Internet. More information will now be set forth regarding each of the foregoing components and the interoperability thereof.

The services platform 106 may include at least one server that hosts one or more services 108. Non-limiting examples of such services 108 may include, but are not limited to a controller service 109, along with other services such as a compute service for computing data, a network service for communicating data, an image service for processing images, a storage service for storing data, a cluster service for providing enhanced availability to one or more of the foregoing services, etc. As further shown, the system 100 may be equipped with a cache 111. As will soon become apparent, such controller service 109 serves for controlling access to the various services 108 using the results of token validation that is stored in the cache 111.

The IAM module 102 is configured to register users 110 by assigning one or more tokens and one or more identifiers to each user that are later shared, possibly after being authenticated using a user name/password combination that is assigned to each user 110 during registration. In the context of the present description, the aforementioned identifier may be any identifier that is different (in at least one respect) from the token. In one embodiment, the aforementioned identifier may include any unique or pseudo-unique identifier that is of a smaller size (e.g. less bits/bytes) as compared to the token. Conversely, the token may include any security data structure that is of a larger size (e.g. more bits/bytes) as compared to the foregoing identifier.

In some optional embodiments, the identifier may possibly include a universally unique identifier (UUID) (e.g., sixteen octets), and the token may possibly include any one or more of the following: any unique identifier or data unique to a particular user (e.g. UUID, etc.), a password, a cryptographic key, biometric data (e.g., data representing a user's fingerprint, retina, facial features, or combinations of these), a digital signature, user role information, time and/or location information for restricting user access based on a time and/or a location, and/or code for facilitating processing of the token for the purpose of validating a particular user. Further, in one possible embodiment, each token may vary (e.g. in terms of size and contents, etc.) depending on a particular service 108 that it is intended to validate. For example, each token may include only those token components (see examples above) that are required for validating the corresponding service 108. Still yet, in different optional embodiments, such validation may involve one or more of decrypting the token using a public-private key combination, populating and caching information extracted from the token, and/or conducting integrity checks on the token and/or information stored therein.

In one possible embodiment, the smaller size of the identifier (as compared to the token) facilitates transmission thereof by requiring less time and bandwidth to communicate the same. As an additional option, such smaller size (and less contents) further enable faster processing of the identifier (as compared to the token). As will soon become apparent, the system 100 utilizes contents of the database 104 to initiate token validation (which is more cumbersome than use of the identifier), for the purpose of validating a user before such user actually accesses one or more services of the services platform 106, so that the smaller, more easily processed identifier may be used to accelerate access to such services by the users 110. To this end, the users 110 are permitted faster access to the services platform 106, while still preserving a sufficient level of security in connection with such access.

To support this functionality, the database 104 is configured to store service usage information relating to usage of at least one of the services 108 by the various users 110. In the present description, such service usage information may include any information that identifies, includes, and/or is derived from such usage which, in turn, may refer to any historical and/or predicted future access to such service(s), information stored by the service(s), and/or functionality thereby provided. For example, in one possible embodiment, the service usage information may identify each of the users 110 (using a user name, the aforementioned identifier and/or token) and the at least one service (using a naming protocol or any other mechanism that allows the tracking of past and/or prospective service usage by the users 110).

Further, in various embodiments, the database 104 may be populated in any desired manner. For example, in one possible embodiment, the database 104 is populated with the service usage information by automatically collecting data on the usage of the service(s) hosted by the services platform 106. In another possible embodiment, the database 104 may be populated with the service usage information by receiving manually created data on the usage of the service(s) in connection with one or more user roles. Specifically, an administrator may populate a template (e.g. using mark-up language) that provides a mapping between the different services 108 of the services platform 106, and different roles that the users 110 may take on. By this design, the users 110 may be validated for access to different services 108 based on a role currently taken or predicted to be taken by such users 110.

Table 1 illustrates simplified, exemplary contents of the database 104, in accordance with one possible embodiment.

TABLE 1

Role_1 --> Service_1, Service_2
Role_2 --> Service_1, Service_3
Role_3 --> Service_4, Service_5

During use of the system 100, the IAM module 102 registers one or more of the users 110 by assigning such users 110 with at least one token and an identifier, and shares the identifier with the corresponding one of the users 110, as indicated by operation 1. Such token and identifier are then stored in internal memory of the IAM module 102.

As mentioned earlier, the database 104 is configured to store service usage information regarding past and/or prospective service usage of the different services 108 of the services platform 106 by the user(s) 110. By querying such service usage information in the database 104 per operation 2, the IAM module 102 predicts which user(s) 110 will use which of the different services 108 and sends the token and identifier for such user(s) 110 to the services platform 106. See operation 3. In response, the services platform 106 uses the controller service 109 to: validate the token, and store the identifier in a manner that is linked to any token validation results in the cache 111, as well as a mapping to the relevant services 108. In other embodiments, the foregoing functionality of the controller service 109 may be distributed across any one or more of the services 108 such that the services 108 independently validate the token.

Table 2 illustrates exemplary contents of the cache 111.

TABLE 2

UUID_1 --> Token_Information_Service_1,
Token_Information_Service_2
UUID_2 --> Token_Information_Service_1,
Token_Information_Service_3
UUID_3 --> Token_Information_Service_4,
Token_Information_Service_5

Operation 3 occurs, at least in part, before a relevant one of the users 110 attempts to access one or more of the different services 108 in operation 4 by using the identifier that was originally allocated by the IAM module 102 in operation 1. At that point, the controller service 109 of the services platform 106 uses the identifier to check (via the cache 111) whether such particular user is authorized to access the requested services 108. If so, the particular user is granted access to the requested service(s) 108 without necessarily requiring, as a runtime precondition, the communication and/or processing of the token for validation purposes (since that has already occurred based on the prediction that it would be necessary—see operation 3).

One or more of the foregoing features of the aforementioned system 100 thereby afford a mechanism for performing token validation before the users 110 request access to the services 108 of the services platform 106 by performing the token validation beforehand based on the prediction of such access. This may, in turn, result in accelerated access to the services 108 of the services platform 106 that would otherwise be foregone in systems that lack such capability. More illustrative information will now be set forth regarding various optional architectures and uses in which the foregoing system 100 may or may not be implemented, per the desires of the user.

For example, more information will be now be described regarding an initial instance when one of the users 110 first accesses the services 108 of the services platform 106 and a manner in which the database 104 may be initially populated, in accordance with various embodiments. It should be noted that the following information is set forth for illustrative purposes and should not be construed as limiting in any manner. Any of the following features may be optionally incorporated with or without the other features described.

Figure 2:
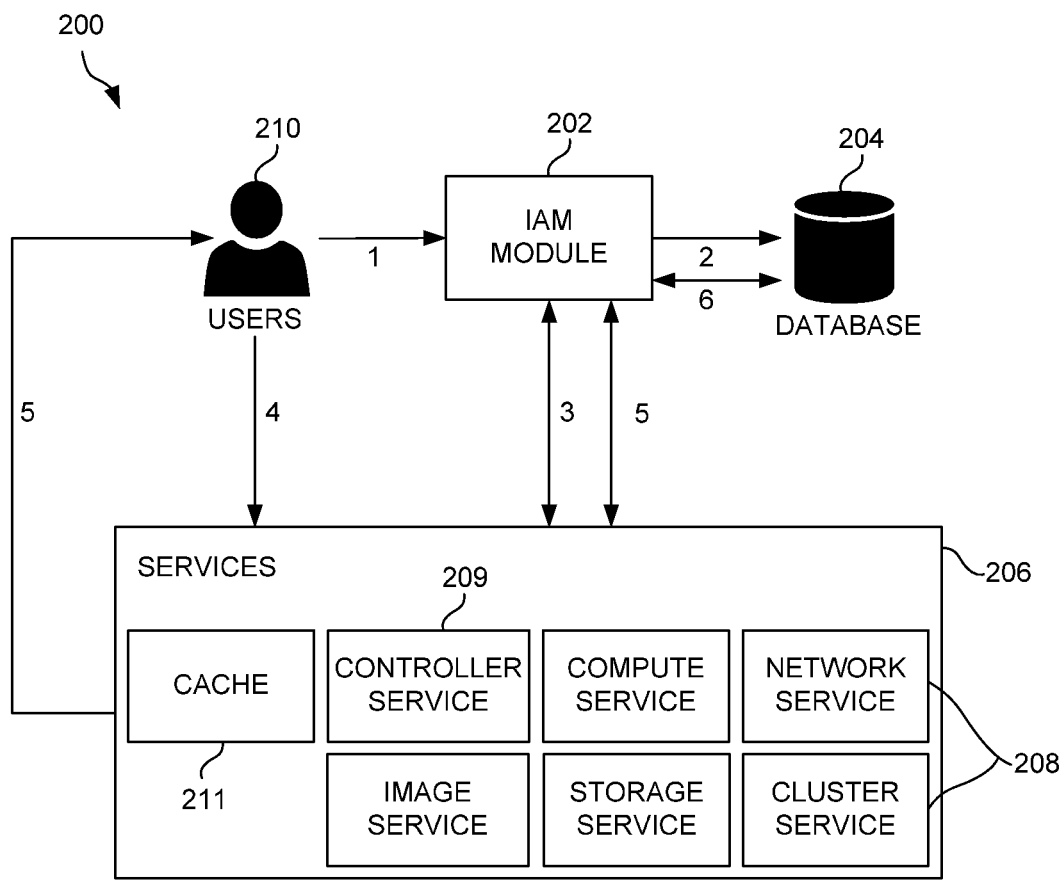
FIG. 2 illustrates a system for predictive security token validation in connection with an initial access by a user, in accordance with another embodiment.

FIG. 2 illustrates a system 200 for predictive security token validation in connection with an initial access by a user, in accordance with another embodiment. As an option, the system 200 may be implemented in the context of any one or more of the embodiments set forth in any previous and/or subsequent figure(s) and/or the description thereof. For example, in one possible embodiment, the system 200 may be implemented with one or more of the features of the system 100 of FIG. 1. However, it is to be appreciated that the system 200 may be implemented in other suitable environments.

Similar to the system 100 of FIG. 1, the system 200 includes an IAM module 202 in communication with a database 204 and a services platform 206 which, in turn, includes services 108 and a cache 211-equipped controller service 209, for permitting access to users 210. Further, after the database 204 has been populated, the system 200 permits early prediction-based token validation, so that, upon a request for access to one or more of the services 108 (using the aforementioned identifier) access may proceed without necessarily requiring another token validation. See operations 1-5 (which are similar to operations 1-5 of FIG. 1 and are incorporated here).

In contrast to the system 100 of FIG. 1, the system 200 is further configured for additional operations that accommodate a situation where the database 204 is not necessarily pre-populated and a user, for an initial time, requests access to one or more of the services 108 (using the aforementioned identifier) without token validation occurring. In such situation, operations 5-6, proceed as follows. Specifically, after it is determined that token validation has not yet occurred in connection with the requesting user 210 (and the requested service(s) 208), the identifier is sent to the IAM module 202 for the purpose of requesting and receiving the token associated with the requesting user 210. See operation 5. To this end, token validation may occur at the services platform 206 and the requesting user 210 may (if validation is successful) thereafter be permitted access to the requested service(s) 208.

Further, in operation 6, the requested access (from operation 4) is logged in the database 204 so that there is a correspondence between the particular user 210 and the requested service(s) 208. Thus, to the extent that the previous token validation (see operation 5) has expired and is required in the future in connection with such requested service(s) 208, the token may be communicated again (based on predictive analytics) to the cache 211-equipped controller service 209 of the services platform 206, for pre-validating such token in advance of any future predicted access to the same requested service(s) 208. More information will now be set forth regarding the functionality of the IAM module 202 and the services platform 206, in accordance with various embodiments.

Figure 3:
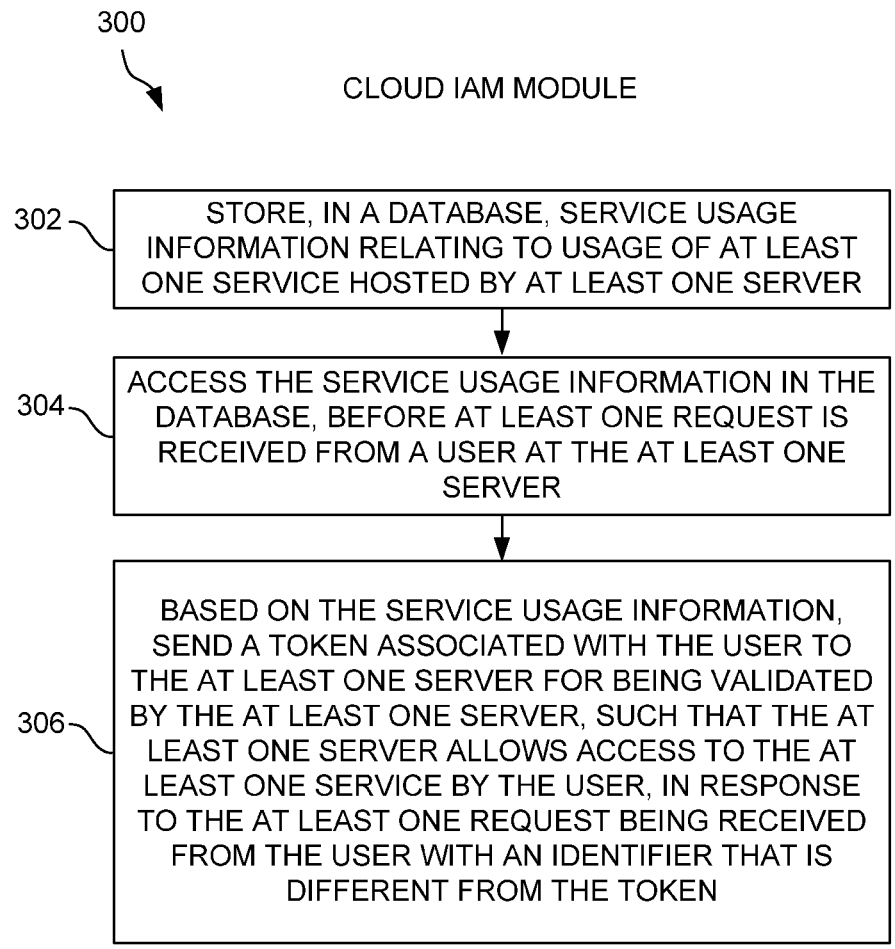
FIG. 3 illustrates a method for predictive security token validation in connection with an IAM module, in accordance with another embodiment.

FIG. 3 illustrates a method 300 for predictive security token validation in connection with an IAM module, in accordance with another embodiment. As an option, the method 300 may be implemented in the context of any one or more of the embodiments set forth in any previous and/or subsequent figure(s) and/or the description thereof. For example, in one possible embodiment, the method 300 may be implemented in the context of the IAM modules 102 and 202 of FIGS. 1 and 2, respectively. However, it is to be appreciated that the method 300 may be implemented in other suitable environments.

As shown, in operation 302, service usage information is stored in at least one database (e.g. the databases 104 and 204 of FIGS. 1 and 2, respectively). As mentioned earlier, such service usage information relates to usage of at least one service hosted by at least one server associated with a services platform (e.g. the services platform 106 and 206 of FIGS. 1 and 2, respectively).

With continuing reference to FIG. 3, additional operations 304-306 are performed before at least one request is received from a user at the at least one server. Specifically, in operation 304, the service usage information is accessed in the database. Further, based on the service usage information, a token associated with the user is sent to the server(s) of the services platform for being validated by the at least one server. See operation 306.

Since the token is sent in advance to any user request, such validation permits the server(s) of the services platform to allow access to the service(s) by the user, in response to the at least one request being received from the user with an identifier (that is different from the token). As mentioned earlier, the combination of the pre-validation of the token and the use of the lightweight identifier-equipped request, permits for a more real-time response to the request, instead of waiting for the communication and/or processing of the heavier token.

As mentioned earlier in connection with the description of FIG. 2, it is possible that no service usage information may exist at all, or any such service usage information may not necessarily be relevant to a service requested by a user. In such case, no early token communication may occur between the IAM module and the services platform, and further operations may be initiated to accommodate such situation. More information regarding such possible operations (as well as the aforementioned predictive analytics) will be set forth during the description of different IAM module embodiments illustrated in one or more subsequent figures (e.g. FIG. 5).

Figure 4:
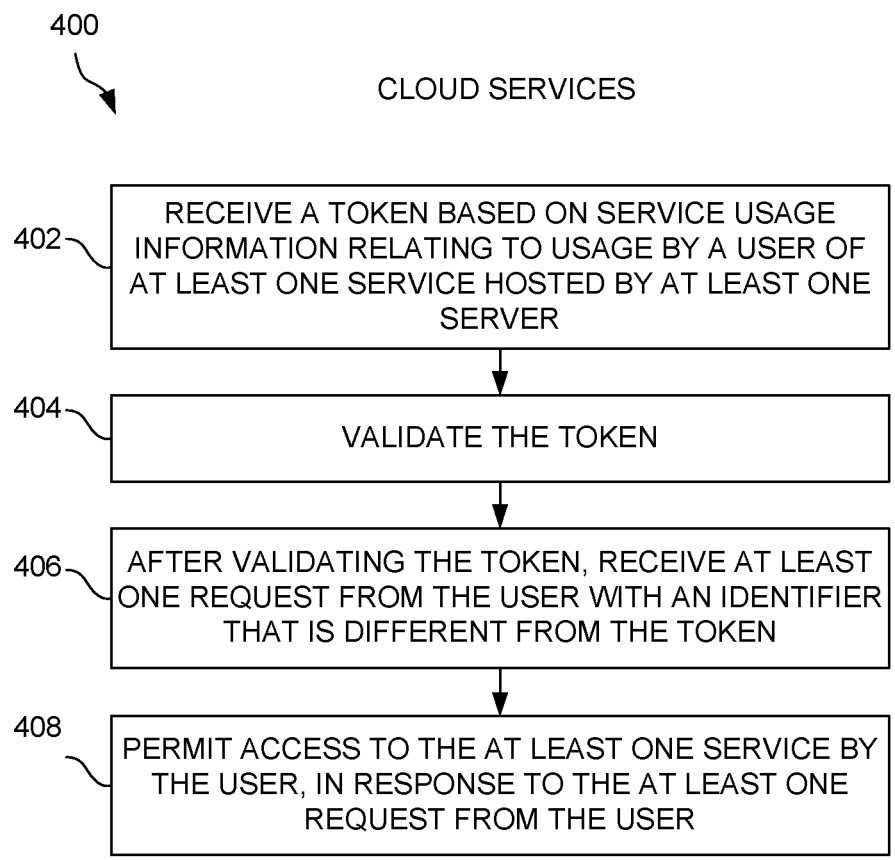
FIG. 4 illustrates a method for predictive security token validation in connection with a services platform, in accordance with another embodiment.

FIG. 4 illustrates a method 400 for predictive security token validation in connection with a services platform, in accordance with another embodiment. As an option, the method 400 may be implemented in the context of any one or more of the embodiments set forth in any previous and/or subsequent figure(s) and/or the description thereof. For example, in one possible embodiment, the method 400 may be implemented in the context of the services platform 106 and 206 of FIGS. 1 and 2, respectively. However, it is to be appreciated that the method 400 may be implemented in other suitable environments.

As shown, a token is received in operation 402. In one possible embodiment, the token may be received at a services platform (e.g. the services platform 106 and 206 of FIGS. 1 and 2, respectively) from an IAM module (e.g. the IAM module 102 and 202 of FIGS. 1 and 2, respectively). Further, whether this token is received or not may be based on service usage information relating to usage by a user of at least one service hosted by at least one server of the services platform. In one embodiment, such service usage information may be accessible via a database (e.g. the databases 104 and 204 of FIGS. 1 and 2, respectively). Specifically, if, based on such service usage information, the IAM module predicts that the user will access one or more of the service of the services platform, the token will be communicated for token validation in connection with such specific user/service combination.

In response to the receipt of the foregoing token, such token is validated in operation 404. Further, after validating the token, the services platform is ready to receive at least one request from the user with an identifier that is different from the token. See operation 406. In response to the at least one request from the user, access is permitted to the at least one service by the user, per operation 408.

By this design, the access operation 408 may be permitted by the services platform without the services platform necessarily receiving the token from the user, since such token was already received earlier from the IAM module and pre-validated. As mentioned earlier, it is possible that the token may not be received in operation 402 and the pre-validation of operation 404 may not necessarily occur as a result of a lack of a prediction that it would be needed. More information regarding such use case scenario will be set forth during the description of different services platform embodiments illustrated in one or more subsequent figures (e.g. FIG. 6).

Figure 5:
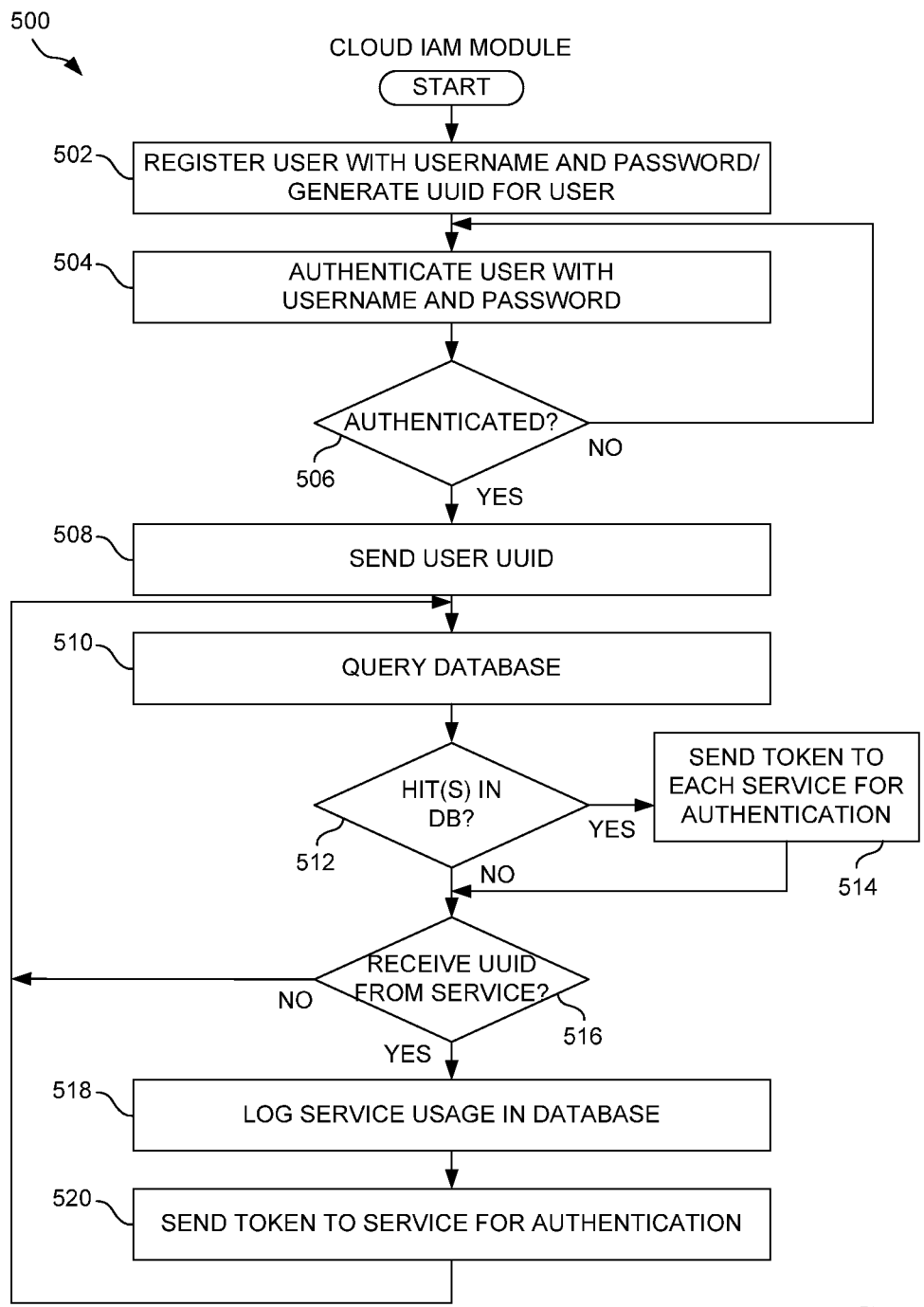
FIG. 5 illustrates a method for predictive security token validation in connection with an IAM module, in accordance with yet another embodiment.

FIG. 5 illustrates a method 500 for predictive security token validation in connection with an IAM module, in accordance with yet another embodiment. As an option, the method 500 may be implemented in the context of any one or more of the embodiments set forth in any previous and/or subsequent figure(s) and/or the description thereof. For example, in one possible embodiment, method 500 may be implemented in the context of the IAM modules 102 and 202 of FIGS. 1 and 2, respectively, as well as be incorporate one or more features of the method 300 of FIG. 3. However, it is to be appreciated that the method 500 may be implemented in other suitable environments.

As shown, the method 500 begins in operation 502 by registering a user with a user name and password, and generating a UUID for such user. In one embodiment, this may be accomplished via an IAM module (e.g. the IAM modules 102 and 202 of FIGS. 1 and 2, respectively) which may or may not be integrated with a services platform (e.g. the services platform 106 and 206 of FIGS. 1 and 2, respectively). Further, while the user name and password may be selected by the user, the IAM module generates the UUID via any random or pseudorandom process. For example, in one embodiment, the UUID may be randomly generated on-the-fly, in response to a registration request from the user. In other embodiments, the UUID may be selected from a previously generated list of random UUIDs.

Once registered, the user is authenticated using the user name/password combination, per operation 504. In various embodiments, such authentication may be carried out in- or out-of-band. Once authenticated per decision 506, the UUID is sent to the user at operation 508. In different embodiments, the UUID may be encrypted or protected by other mechanisms. With the user now equipped with the UUID, the user is now able to request access to various services of the services platform at a later time. Beforehand, however, the method 500 continues with operations 510-520 for permitting the services platform to pre-validate the token, in order to allow expedited access to requested services.

Specifically, in operation 510, a database (e.g. the databases 104 and 204 of FIGS. 1 and 2, respectively) is queried for service usage information. As mentioned earlier, such service usage information may include historical data for the user at hand, and/or predictive data that identifies roles (e.g. administrator, manager, general user, etc.) of certain users that typically access certain services of the services platform. For the latter, a current, prevalent, and/or predicted role of the user may therefore be used to infer which services should be pre-validated. As a further option, other information may also be stored in connection with each user including, but not limited to an indication of times and/or locations when the certain services are accessed by the user, a type of services accessed by the user, and/or roles historically held by the user.

It is then determined in decision 512 whether there are any such hits in the database indicating that the current user is likely to access certain services of the services platform. It should be noted that such "hits" may be accomplished in any desired manner. In one possible embodiment, it may be determined whether the database indicates that any services have been accessed by the user, in which case such services may be pre-validated.

In another embodiment, a threshold likelihood may be predetermined (or even dynamically determined) by an administrator of the IAM module, and any service usage information may be compiled, aggregated, etc. in order to calculate a specific likelihood which may then be compared against the threshold likelihood. If such threshold is met, decision 512 may identify a "hit" and relevant services may be pre-validated.

In any case, in operation 514, the token is sent to the services platform for validation by the services platform, so that subsequently-received (post-validation) service access requests may be administered via the UUID and not necessarily require the validation occur in whole or in part between the receipt of the request and the permitted access to the service. In one embodiment, a single token may be sent to the services platform with an indication as to which of the services are to be pre-validated based on the service usage information, so that such indication can be tracked by the services platform. In another embodiment, a plurality of service-specific tokens may be communicated to the services platform so that each service may be separately validated via a corresponding token.

Thus, the operations 510-514 may involve determining whether the user has previously used the requested service(s) and, then, sending the token if it is determined that the user has previously used the at least one service; or abstaining from sending the token, if it is determined that the user has not previously used the at least one service. In the case of the latter, any subsequent request for access to a service may result in a failed request, since token validation has not occurred.

In still other embodiments, a content of the token may be altered, based on the service usage information. For example, if the token is being sent in connection with a first service (to validate the user for using such first service), the token may include first information specific to the first service. Further, if the token is being sent in connection with a second service (to validate the user for using such second service), the token may include second information specific to the second service.

As mentioned earlier in connection with the description of FIGS. 2 and 3, it is possible that no service usage information may exist, or any such service usage information may not necessarily be relevant to a particular requested service. In such case, no early token communication may occur between the IAM module and the services platform in order to enable pre-validation, and further operations may be initiated to accommodate such a situation where there is a failed request(s) due to a lack of token validation.

Specifically, the UUID received (from the user/at the services platform) in connection with the aforementioned failed request(s) may be used to initiate further processing at the IAM module. Specifically, after receipt of the identifier by the services platform (and after failed validation), such UUID may be communicated from the services platform to the IAM module. In response to the receipt of the UUID per decision 516, the IAM module logs the failed request as service usage information in the database per operation 518 and the token associated with the user is sent to the server(s) of the services platform in operation 520, for being thereby validated. Thus, access (albeit delayed) may nevertheless be permitted to a service that was requested by the user by providing the token to the services platform, for validation purposes. More information will be set forth regarding related operation from the perspective of the services platform, during the description of FIG. 6.

In other possible embodiments, tokens sent in operations 514 and/or 520 may be limited in terms of a time period (after validation), during which access is allowed (i.e. the validation is still effective) during a particular session. Such time period may be predetermined and/or static, or be dynamically determined based on the service usage information. For example, it may be known, through the service usage information, that a particular user will likely only access the services platform during a short time period at a first location, but will likely access the services platform during a longer time period at a second location. Such time period limitations may be sent with the token in some embodiments, but may also be established and enforced at the services platform (e.g. by only temporarily caching the token validation results, etc.). In any case, the method 500 repeats operations 510-514 as a function of different queries including different parameters (e.g. time, location, role, any those mentioned earlier, etc.) for sending and re-sending tokens to accommodate such time period limitations. Thus, the aforementioned time and location parameters (for example) may be used to both determine when the tokens are sent to the services platform for validation, as well as when to revoke tokens based on apparent non-usage of a particular service, or when a time and/or location is no longer applicable since it does not reflect when and/or where the user typically uses the particular service.

Figure 6:
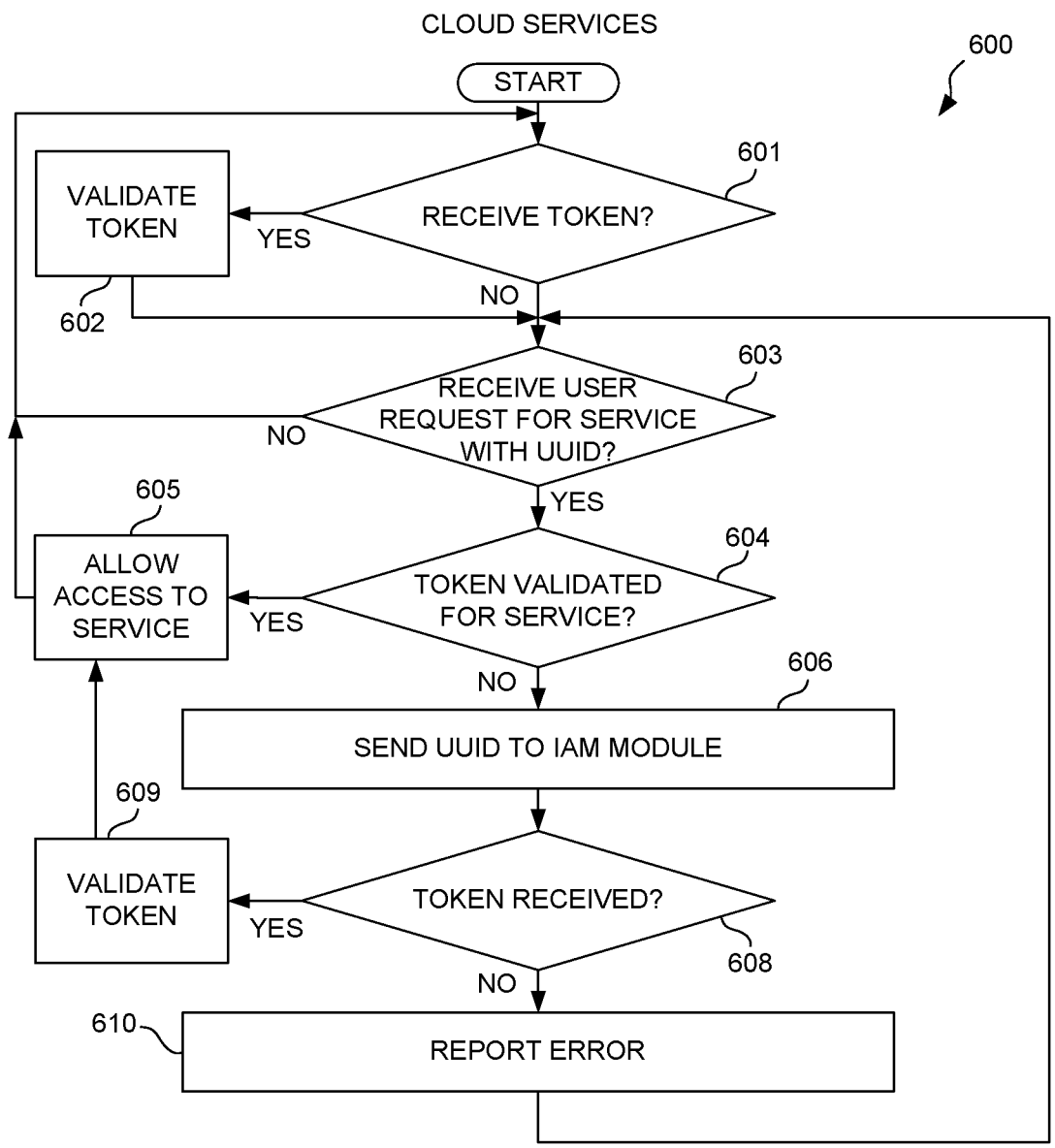
FIG. 6 illustrates a method for predictive security token validation in connection with a services platform, in accordance with yet another embodiment.

FIG. 6 illustrates a method 600 for predictive security token validation in connection with a services platform, in accordance with yet another embodiment. As an option, the method 600 may be implemented in the context of any one or more of the embodiments set forth in any previous and/or subsequent figure(s) and/or the description thereof. For example, in one possible embodiment, the method 600 may be implemented in the context of the services platform 106 and 206 of FIGS. 1 and 2, respectively, as well as incorporate one or more features of the method 400 of FIG. 4. However, it is to be appreciated that the method 600 may be implemented in other suitable environments.

As shown, per decision 601, it is determined whether a token is received at a services platform (e.g. the services platform 106 and 206 of FIGS. 1 and 2, respectively) from an IAM module (e.g. the IAM modules 102 and 202 of FIGS. 1 and 2, respectively). Such token may be actively requested or passively received, in different embodiments. Further, in one possible embodiment, such token may be accompanied by an indication of one or more specific services provided by the services platform.

Upon receipt, the token may be validated in operation 602. Further, such validation may, in some embodiments, be designated for use on only a subset of the complete set of services provided by the services platform. As will become further apparent, such validation may occur prior to any user request for service being received at the services platform, thus permitting operation 602 to occur before the remaining operations.

In particular, per decision 603, it is determined whether a user request for service is received by the services platform. Such request for service is accompanied by at least a UUID and/or user name (that was registered with the requesting user), as well as at least one indication of at least one service provided by the services platform. In situations where a token has already been communicated from the IAM module for validation (e.g. see operations 601-602) it may be determined so in decision 604, thus allowing accelerated access to the requested service per operation 605. In various embodiments, the user thereby obtains access to the requested service without waiting for token validation, thereby providing such access in real-time, near real-time, immediately, and/or possibly with fewer or even without intermediate operations between the receipt of the request and the permitted access (other than validation of the UUID and/or user name). In such case, transport layer security (TLS) may be used for channel-level security and remediation from man-in-the-middle (MiTM)-based attacks.

As mentioned earlier in connection with the description of FIGS. 2 and 3 and operations 518-520 of FIG. 5, it is possible that no early token communication may occur between the IAM module and the services platform in order to enable pre-service request validation per operations 601-605. Further, as mentioned earlier, the permitted access operation 605 may be timed out after a predetermined amount of time for security reasons, thus requiring an updated token validation. In any of such situations, further operations may be initiated to accommodate such a situation where there is a failed request(s) (i.e. a negative determination at decision 604).

Specifically, the UUID that was received with the service request may be forwarded from the services platform to the IAM module in operation 606, in order to initiate further processing at the IAM module so that a token may be issued from the IAM module to the services platform, for validation in connection with the service request. Accordingly, a response to operation 606 is awaited per decision 608. If no token is received, an error is reported to the user via operation 610. On the other hand, upon receipt of the token, token validation may ensue per operation 609 in connection with the appropriate service, thus permitting access to such service by the requesting user. See, again, operation 605. Thus, access (albeit delayed) may nevertheless be permitted to a service that was requested by the user by providing the token to the services platform, for validation purposes.

Figure 7:
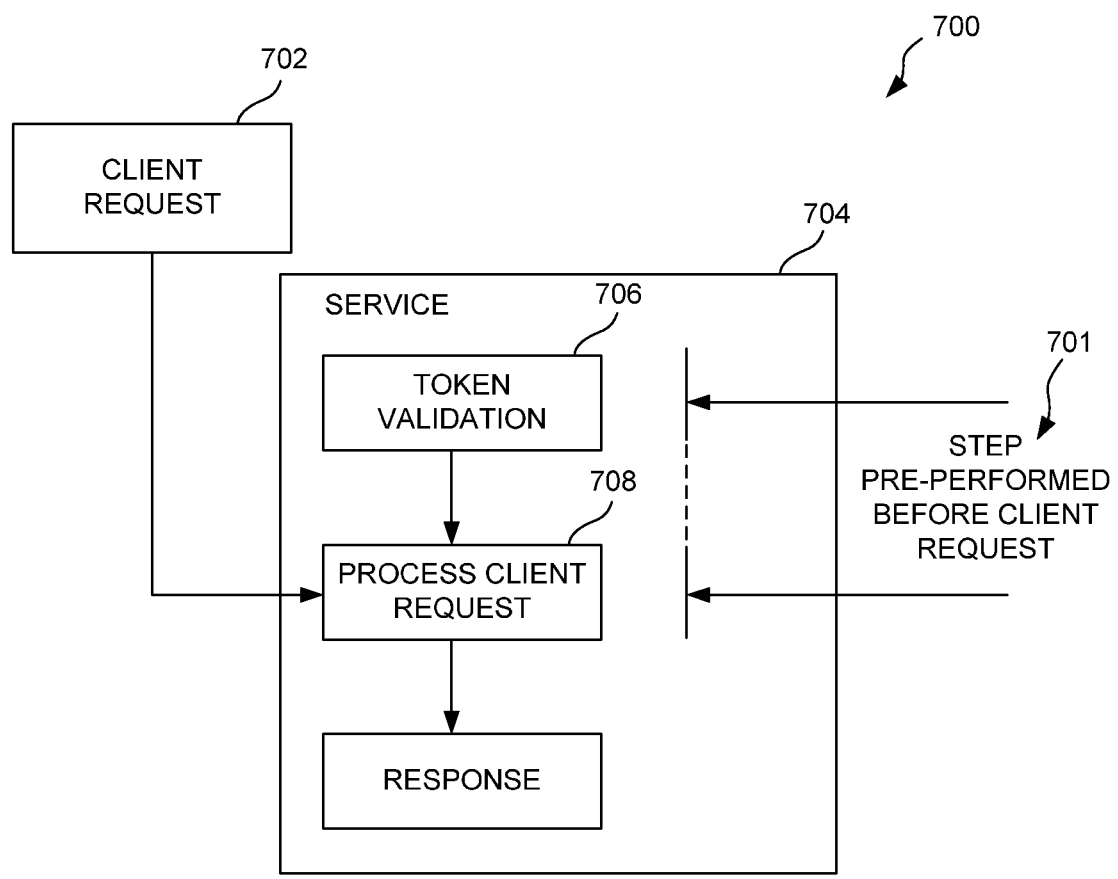
FIG. 7 illustrates an example of an amount of time that is saved between a client request and access to a requested service by way of prediction-based token validation that is carried out in advance of client request processing.

Thus, the method 600 accommodates situations where different services may or may not have validated tokens associated therewith. Further, each of such situations may be accommodated for providing, in some scenarios, faster access to requested services and, in other scenarios, token validation (and slower service access) with a mechanism for enabling faster access for subsequent requests for such service. FIG. 7 illustrates an example 700 of an amount of time 701 that is saved between a client request 702 and access to a requested service 704 by way of prediction-based token validation 706 that is carried out in advance of client request processing 708.

Figure 8:
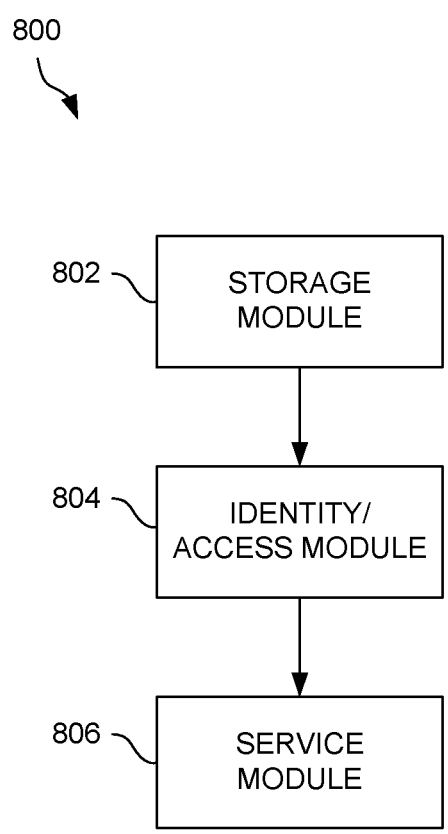
FIG. 8 illustrates a system for predictive security token validation, in accordance with an embodiment.

FIG. 8 illustrates a system 800 for predictive security token validation, in accordance with an embodiment. As an option, the system 800 may be implemented with one or more features of any one or more of the embodiments set forth in any previous and/or subsequent figure(s) and/or the description thereof. However, it is to be appreciated that the system 800 may be implemented in other suitable environments.

As shown, a storage means in the form of a storage module 802 is provided for storing service usage information relating to usage of at least one service hosted by at least one server. In various embodiments, the storage module 802 may include, but is not limited to the databases 104 and 204 of FIGS. 1 and 2, respectively, memory (to be described later) and any software controlling the same, and/or any other circuitry capable of the aforementioned functionality.

Also included is an IAM means in the form of an IAM module 804 in communication with the storage module 802 for: causing storage of the service usage information; and, before at least one request is received from a user: accessing the service usage information in the storage module 802, and based on the service usage information, sending a token associated with the user to at least one server for being validated, such that the at least one server allows access to the at least one service by the user, in response to the at least one request being received from the user with an identifier that is different from the token (e.g. see the method 300 of FIG. 3). In various embodiments, the IAM module 804 may include, but is not limited to the IAM module 102 and 202 of FIGS. 1 and 2, respectively, at least one processor (to be described later) and any software controlling the same, and/or any other circuitry capable of the aforementioned functionality.

With continuing reference to FIG. 8, service means in the form of a service module 806 is in communication with the IAM module 804 for receiving a token based on service usage information relating to usage by a user of at least one service hosted by at least one server; validating the token; after validating the token, receiving at least one request from the user with an identifier that is different from the token; and permitting access to the at least one service by the user, in response to the at least one request from the user (e.g. see the method 400 of FIG. 4). In various embodiments, the service module 806 may include, but is not limited to the services platform 106 and 206 of FIGS. 1 and 2, respectively, at least one processor (to be described later) and any software controlling the same, and/or any other circuitry capable of the aforementioned functionality.

Figure 9:
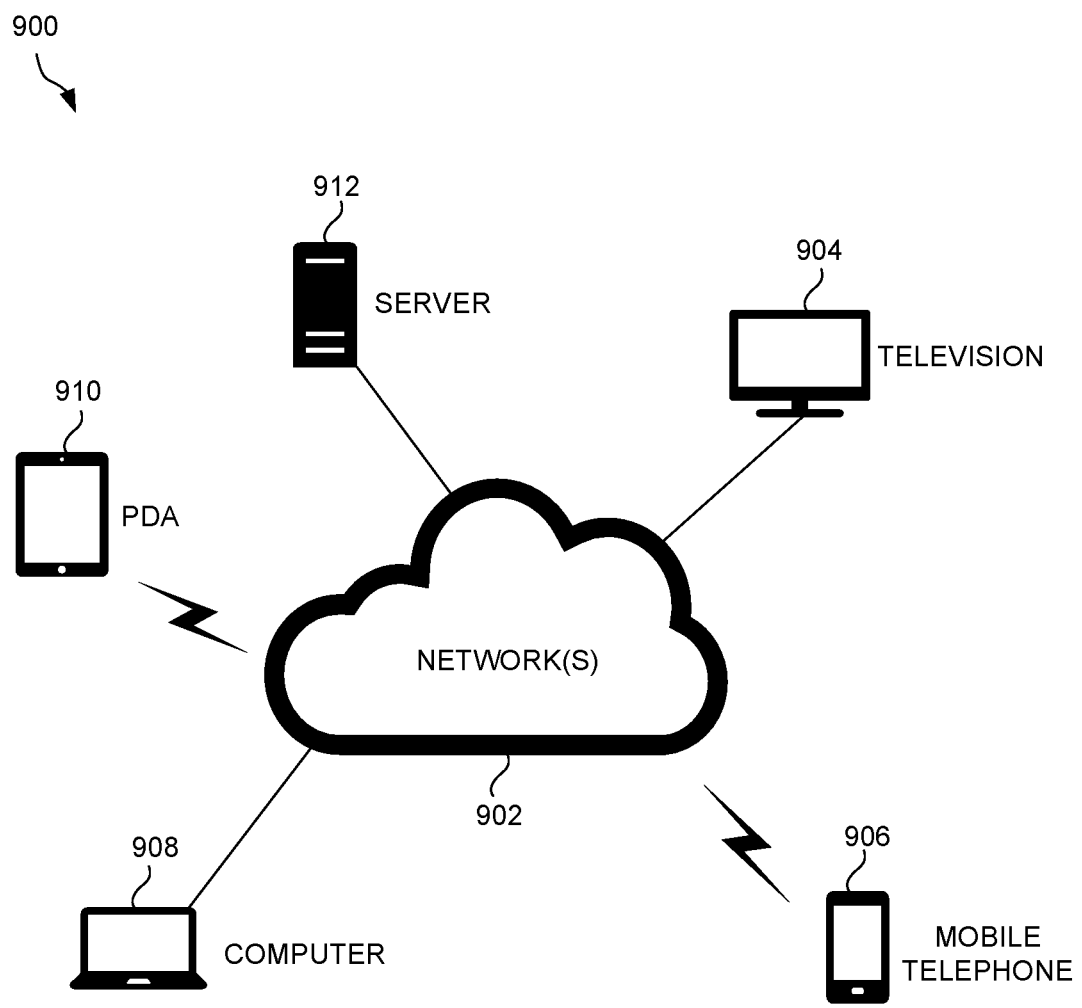
FIG. 9 is a diagram of a network architecture, in accordance with an embodiment.

FIG. 9 is a diagram of a network architecture 900, in accordance with an embodiment. As shown, at least one network 902 is provided. In various embodiments, any one or more components/features set forth during the description of any previous figure(s) may be implemented in connection with any one or more of the components of the at least one network 902.

In the context of the present network architecture 900, the network 902 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 902 may be provided.

Coupled to the network 902 is a plurality of devices. For example, a server 912 and a computer 908 may be coupled to the network 902 for communication purposes. Such computer 908 may include a desktop computer, lap-top computer, and/or any other type of logic. Still yet, various other devices may be coupled to the network 902 including a personal digital assistant (PDA) device 910, a mobile phone device 906, a television 904, etc.

Figure 10:
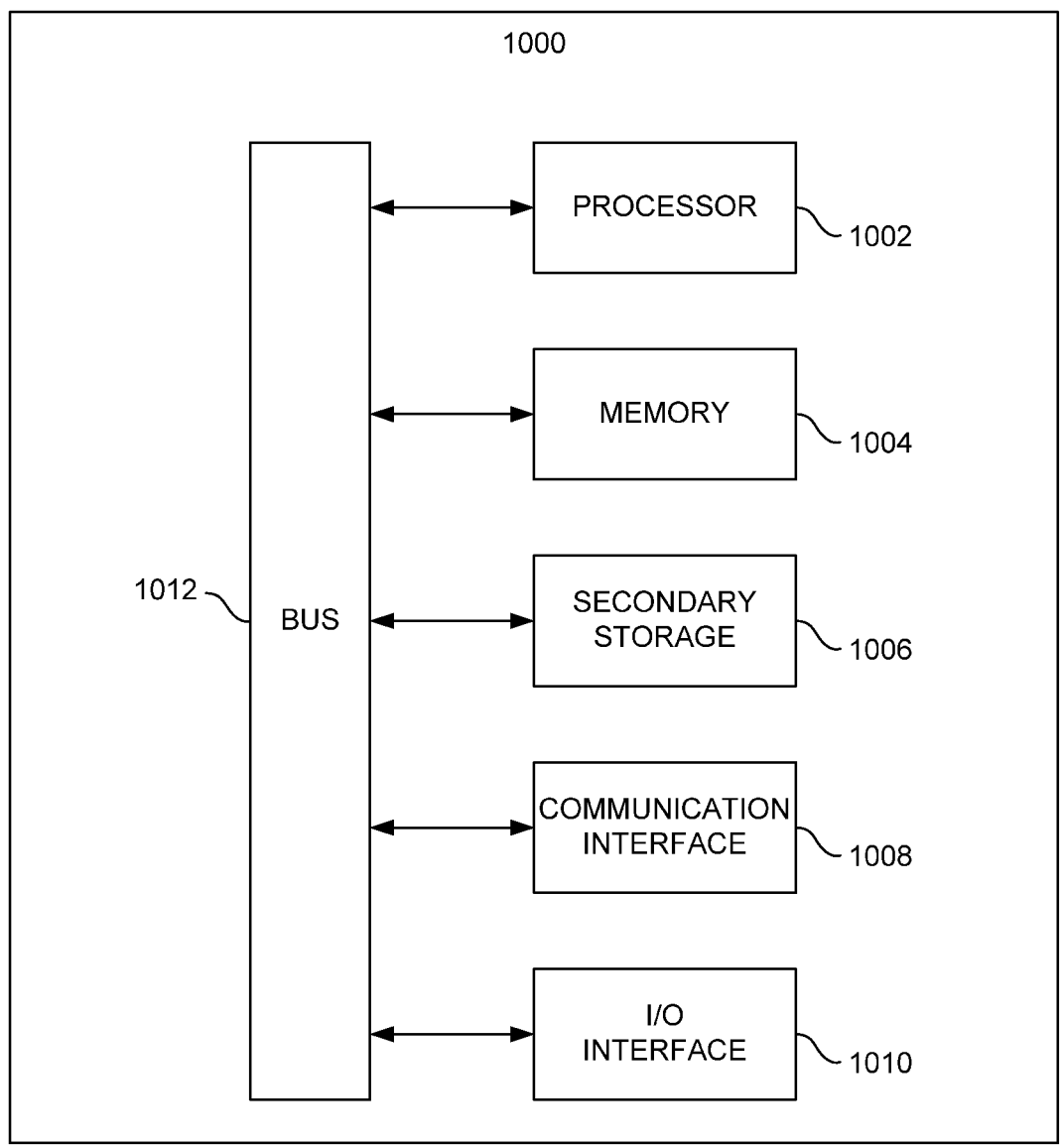
FIG. 10 is a diagram of an exemplary processing device, in accordance with an embodiment.

FIG. 10 is a diagram of an exemplary processing device 1000, in accordance with an embodiment. As an option, the processing device 1000 may be implemented in the context of any of the devices of the network architecture 900 of FIG. 9. However, it is to be appreciated that the processing device 1000 may be implemented in any desired environment.

As shown, the processing device 1000 includes at least one processor 1002 which is connected to a bus 1012. The processing device 1000 also includes memory 1004 [e.g., hard disk drive, solid state drive, random access memory (RAM), etc.] coupled to the bus 1012. The memory 1004 may include one or more memory components, and may even include different types of memory.

Further included is a communication interface 1008 (e.g. local/remote network interface, memory access interface, etc.) and an input/output (I/O) interface 1010 (e.g. display, speaker, microphone, touchscreen, touchpad, mouse interface, etc.).

The processing device 1000 may also include a secondary storage 1006. The secondary storage 1006 coupled to the bus 1012 and/or to other components of the processing device 1000. The secondary storage 1006 can include, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the memory 1004, the secondary storage 1006, and/or any other memory, for that matter. Such computer programs, when executed, enable the processing device 1000 to perform various functions (as set forth above, for example). Memory 1004, secondary storage 1006 and/or any other storage comprise non-transitory computer-readable media.

In one embodiment, the at least one processor 1002 executes instructions in the memory 1004 or in the secondary storage 1006 to store, in a database, service usage information relating to usage of at least one service hosted by at least one server. Before at least one request for service is received from a user at the at least one server, the service usage information in the database is accessed. Based on such service usage information, a token associated with the user is sent to the at least one server for being validated by the at least one server, such that the at least one server allows access to the at least one service by the user, in response to the at least one request for service being received from the user with an identifier that is different from the token.

In some embodiments, the identifier may include a universally unique identifier (UUID).

In some embodiments, the service usage information may identify the user and the at least one service.

In some embodiments, the service usage information may identify a time and/or a location associated with the user.

In some embodiments, the token may be sent based on the service usage information, by: determining whether the user has previously used the at least one service; and sending the token, if it is determined that the user has previously used the at least one service.

In some embodiments, the token may be sent based on the service usage information, by: abstaining from sending the token, if it is determined that the user has not previously used the at least one service.

In some embodiments, the token may be sent based on the service usage information, by: altering a content of the token, based on the service usage information.

In some embodiments, the identifier may be received in connection with at least one failed request for service that failed due to a lack of token validation. As an option, in response to the receipt of the identifier, the at least one failed request for service may be logged as service usage information in the database. As a further option, in response to the receipt of the identifier, the token associated with the user may be sent to the at least one server for being validated by the at least one server.

In some embodiments, the database may be populated with the service usage information by automatically collecting data on the usage of the at least one service hosted by the at least one server.

In some embodiments, the database may be populated with the service usage information by receiving manually created data on the usage of the at least one service hosted by the at least one server in connection with one or more user roles.

In some embodiments, access may be allowed to the at least one service, in response to the at least one request for service being received from the user, without waiting for the token to be validated.

In another embodiment, the at least one processor 1002 executes instructions in the memory 1004 or in the secondary storage 1006 to, before receiving at least one request for service from a user with an identifier, receive a token that is different from the identifier, based on service usage information relating to usage by the user of at least one service hosted by at least one server. Further, the token is validated. Still yet, after validating the token, the at least one request for service is received from the user. Access to the at least one service by the user is then permitted, in response to the at least one request for service from the user.

In some embodiments, the access may be permitted without receiving the token from the user.

In some embodiments, another request for service may be received from the user in connection with another service hosted by the at least one server. In response to the another request for service from the user, it may be determined whether the token is validated in connection with the another service. If it is determined that the token is not validated in connection with the another service, the identifier may be sent for requesting the token so that the token can be validated.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), or the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; or the like.

Computer-readable non-transitory media includes all types of computer readable media, including magnetic storage media, optical storage media, and solid state storage media and specifically excludes signals. It should be understood that the software can be installed in and sold with the devices described herein. Alternatively the software can be obtained and loaded into the devices, including obtaining the software via a disc medium or from any manner of network or distribution system, including, for example, from a server owned by the software creator or from a server not owned but used by the software creator. The software can be stored on a server for distribution over the Internet, for example.

It should be understood that the arrangement of components illustrated in the Figures described are exemplary and that other arrangements are possible. It should also be understood that the various system components defined by the claims, described below, and illustrated in the various block diagrams represent logical components in some systems configured according to the subject matter disclosed herein.

For example, one or more of these system components may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A processing device, comprising:
a non-transitory memory comprising instructions; and
one or more processors in communication with the memory, wherein the one or more processors execute the instructions to:
before receiving a request for service from a user device with an identifier, receive a token that is different from the identifier, the token identifying a combination of the user device and service usage information, the service usage information relating to past usage by the user device of a service hosted by a server;
validate the token based on the combination and based on a prediction that the user device will access the service;
after validating the token, receive the request for service from the user device; and
permit access to the service by the user device, in response to the request for service from the user device and based on validating the token.

2. The processing device of claim 1, wherein the identifier includes a universally unique identifier (UUID).

3. The processing device of claim 1, wherein the service usage information identifies the user device and the service.

4. The processing device of claim 1, wherein the service usage information identifies a time associated with the user device.

5. The processing device of claim 1, wherein the service usage information identifies a location associated with the user device.

6. The processing device of claim 1, wherein the service usage information further relates to a user role associated with a user of the user device during the past usage.

7. The processing device of claim 1, wherein the one or more processors execute the instructions to:
receive another request for service from the user device in connection with another service hosted by the server;
in response to the another request for service from the user device, determine whether the token has been validated in connection with the another service; and
if it is determined that the token has not been validated in connection with the another service, sending the identifier for requesting the token so that the token can be validated.

8. The processing device of claim 1, wherein the prediction is generated using the service usage information.

9. The processing device of claim 1, wherein the token includes an indication of the service hosted by the server.

10. The processing device of claim 9, wherein the one or more processors execute the instructions to:
validate the token based on the service in the indication matching the service identified by the request.

11. A computer-readable medium storing computer instructions for performing token validation within a communication network, wherein the instructions when executed by one or more processors of a computing device within the communication network, cause the one or more processors to:
before receiving a request for service from a user device with an identifier, receive a token that is different from the identifier, the token identifying a combination of the user device and service usage information, the service usage information relating to past usage by the user device of a service hosted by a server;
validate the token based on the combination and based on a prediction that the user device will access the service;
after validating the token, receive the request for service from the user device; and
permit access to the service by the user device, in response to the request for service from the user device and based on validating the token.

12. The computer-readable medium of claim 11, wherein the identifier includes a universally unique identifier (UUID).

13. The computer-readable medium of claim 11, wherein the service usage information identifies at least one of:
the user device and the service;
a time associated with the user device; and
a location associated with the user device.

14. The computer-readable medium of claim 11, wherein the service usage information further relates to a user role associated with a user of the user device during the past usage.

15. The computer-readable medium of claim 11, wherein the prediction is generated using the service usage information.

16. The computer-readable medium of claim 11, wherein the token includes an indication of the service hosted by the server.

17. The computer-readable medium of claim 16, wherein the instructions further cause the one or more processors to:
validate the token based on the service in the indication matching the service identified by the request.

18. A computer-implemented method, comprising:
before receiving a request for service from a user device with an identifier, receiving a token that is different from the identifier, the token identifying a combination of the user device and service usage information, the service usage information relating to past usage by the user device of a service hosted by a server;
validating the token based on the combination and based on a prediction that the user device will access the service;
after validating the token, receiving the request for service from the user device; and permitting access to the service by the user device, in response to the request for service from the user device.

19. The computer-implemented method of claim 18, wherein the identifier includes a universally unique identifier (UUID).

20. The computer-implemented method of claim 18, wherein the service usage information identifies at least one of:
- the user device and the service;
- a time associated with the user device; and
- a location associated with the user device.

* * * * *